US006189285B1

(12) United States Patent
Mockry

(10) Patent No.: US 6,189,285 B1
(45) Date of Patent: Feb. 20, 2001

(54) PULTRUDED FRP STRUCTURAL ASSEMBLY FOR WATER COOLING TOWERS

(75) Inventor: Eldon F. Mockry, Lenexa, KS (US)

(73) Assignee: The Marley Cooling Tower Company, Overland Park, KS (US)

( * ) Notice: Under 35 U.S.C. 154(b), the term of this patent shall be extended for 0 days.

(21) Appl. No.: 09/174,998

(22) Filed: Oct. 19, 1998

(51) Int. Cl.[7] .................................................. E04C 3/30
(52) U.S. Cl. .................... 52/720.1; 52/730.1; 52/730.4; 52/730.6; 52/731.1; 52/731.2; 52/731.7; 52/732.1; 52/733.2; 52/736.1; 52/737.1; 52/737.6; 52/739.1; 52/732.2
(58) Field of Search ................................ 52/726.2, 726.3, 52/729.1, 730.1, 730.4, 730.6, 737.1, 737.6, 736.1, 739.1, 731.1, 731.7, 729.2, 729.5, 730.5, 731.2, 731.3, 731.4, 731.5, 731.8, 731.9, 732.1, 732.2, 732.3, 736.2, 737.2, 733.2; D25/126

(56) References Cited

U.S. PATENT DOCUMENTS

| 304,798 | * | 9/1884 | Butz ..................................... 52/731.2 |
| 4,049,082 | * | 9/1977 | Reid ..................................... 182/217 |
| 4,798,037 | * | 1/1989 | Collins ................................. 52/732.1 |
| 5,054,197 | | 10/1991 | Kato et al. . |
| 5,155,961 | * | 10/1992 | Bardo ..................................... 52/646 |
| 5,236,625 | | 8/1993 | Bardo et al. . |
| 5,487,849 | | 1/1996 | Curtis . |
| 5,585,047 | | 12/1996 | Mortensen et al. . |

* cited by examiner

*Primary Examiner*—Christopher T. Kent
*Assistant Examiner*—Jennifer I. Thissell
(74) *Attorney, Agent, or Firm*—Hovey, Williams, Timmons & Collins

(57) ABSTRACT

Improved water cooling towers are provided which include pultruded fiberglass reinforced plastic (FRP) structural components and assemblies. To this end, integrally formed, pultruded channels (26, 26a) are provided having central web sections (28, 28a), endmost flanges (30, 30a, 32, 32a), and obliquely oriented, reinforcing legs (34, 34a, 36, 36a). Pultruded tubular columns or beams (68) are also provided having thickened central wall sections (94, 96, 98, 100) and relatively thin corner sections (102, 104, 106, 108). In order to connect the beams (68) and channels (26, 26a), use is made of connectors (110) having pultruded FRP sleeves (118) and an associated bolt and nut assembly (112, 114). The sleeve (118) is designed to pass through aligned apertures (120, 124, 122, 126) in the beam walls and channel member sections to provide greater strength and shear capacity.

17 Claims, 3 Drawing Sheets

PULTRUDED FRP STRUCTURAL ASSEMBLY FOR WATER COOLING TOWERS

BACKGROUND OF THE INVENTION

1. Field of the Invention

The present invention is concerned with water cooling towers equipped with pultruded structural components and assemblies, typically as a part of the tower as frames and supports. The structural components hereof can be used either in new tower constructions or in retrofits of existing wooden-frame towers. More particularly, the invention is concerned with towers employing pultruded FRP (fiberglass reinforced plastic) structural channels of improved design having increased strength characteristics with lowered material usage, and the combination of such structural channels with elongated tubular pultruded FRP beams to form improved structural assemblies.

2. Description of the Prior Art

In recent years, standard FRP structural pultrusions (e.g., tubular beams and channels) have become available from a number of suppliers and have been used in the construction of large industrial cooling towers. FRP offers superior corrosion and fire resistance properties compared to wood for some applications. Channel shapes are usually used for horizontal beams or girt members, whereas square tubes are commonly used for columns and diagonal strut members. These types of members are employed to build frames in the longitudinal and transverse directions of the cooling tower. Channel sections may also be used for intermediate joists to support fan decking, fill structure, or drift eliminators between principal frames. Self-drilling, self-tapping screws are often used for attachment of these joists to the frames. General constructions of this type are disclosed in U.S. Pat. No. 5,811,035. Tower framing is often built manually one member at a time and is referred to as a "stick built" construction. Alternately, frames known as "bents" can be assembled on the ground and hoisted into position.

Custom pultruded tower framing members have been proposed in the past. For example, U.S. Pat. Nos. 5,028,357, 5,155,961 and 5,236,625 disclose methods of erecting panels and beams that frame into pairs of flanges to give a cruciform (tic-tac-toe) column. U.S. Pat. No. 5,487,849 describes a modular cooling tower concept using large custom pultruded sidewall panels, custom corner moldings, and hollow beams used to carry water. U.S. Pat. No. 5,047,197 also describes pultruded structural members interconnected by couplers including a metal or synthetic resin sleeve that extends through a tubular beam and abuts the adjacent face of channel members; a bolt and nut assembly is passed through the sleeve for connection purposes. A problem with this construction is that the sleeve is configured to have a substantially larger inner diameter, as compared with the bolt; this means that the bolt cannot participate with the sleeve in resisting shearing forces. Moreover, this reference does not describe matching the bearing capacity of a sleeve through the channels with the sleeve through the tube. Rather, this reference promotes the use of blind rivets to connect structural members together, and is therefore not concerned with bearing capacities of bolted fasteners.

In addition to new tower constructions, FRP pultrusions are being increasingly used in reconstruction of wood-frame cooling towers. Serious wood rot in cooling towers is found occasionally and can often be the result of water chemistry and/or operational procedures which alternately wet out and dry the tower components repetitively. Rot is usually isolated in certain areas of the tower (e.g., in the warm moist plenum or the hot water basin regions). FRP components offer rot resistance and may be an economical choice for the tower owner if repeated replacement of wooden components is required. Unfortunately, adequate, economical, standard pultrusions are not currently available in compatible dimensions to replace wood members directly. For example, 4 inch and 6 inch deep channel members have exactly 4 inch and 6 inch depths. On the other hand, standard dimensional wooden 2×4s and 2×6s are actually 1.5 inches×3.5 inches and 1.5 inches×5.5 inches respectively. The 0.5 inch difference may present difficulties when an attempt is made to use FRP members. Thus, in a replacement of a top girt supporting a water basin, FRP channels cannot be notched 0.5 inches, because this would severely detract from the bending capacity and other structural features of the channels. Therefore, in the past it has been necessary to raise the basin floor 0.5 inches to accommodate the FRP channels. This in turn leads to modification in the piping details associated with the basin.

Standard structural pultruded cross-sections owe their origins to the steel industry. The pultrusion industry mimicked the steel shapes due to the familiarity of the design professionals with steel construction. Available pultruded shapes are typically, I-beams, wide flange beams, channel shapes, square and round tubes, and angle shapes. The variability of available shape sizes in pultrusion is not as vast as in structural steel. Therefore, selection of an adequate section for a member may result in substantial capacity above what a design requires. This results in inefficient use of material and lessens the economy of pultrusions. The material and structural properties of pultrusions are very different from steel. Thus, it is only natural for pultruded shapes to evolve into different forms which optimize their characteristics.

Pultrusions generally have nonhomogeneous, orthotropic material properties due to unidirectional reinforcements oriented in the lengthwise direction (the direction of the pull). Continuous strand mats are often used to provide some reinforcement in the crosswise direction (normal to the direction of pull). Typical pultrusions have strong material properties in the lengthwise direction and are weaker in the crosswise direction. Beam shear is usually weak because of the weaker crosswise reinforcements.

Steel is generally classified as a homogeneous, isotropic material. Typical FRP and steel material properties are listed in the following table.

Table Comparing Material Properties of FRP Pultrusion and Steel

| Property | Direction* | Pultrusion | Steel |
|---|---|---|---|
| Tensile Strength, psi | LW | 30,000 | 36,000 |
|  | CW | 7,000 | 36,000 |
| Tensile Modulus, psi | LW | 2,500,000 | 29,000,000 |
|  | CW | 800,000 | 29,000,000 |
| Compressive Strength, psi | LW | 30,000 | 36,000 |
|  | CW | 15,000 | 36,000 |
| Flexural Strength, psi | LW | 30,000 | 36,000 |
|  | CW | 10,000 | 36,000 |
| Flexural Modulus, psi | LW | 1,800,000 | 29,000,000 |
|  | CW | 800,000 | 29,000,000 |
| Beam Shear Strength, psi | — | 4,500 | 17,000 |
| Specific Gravity | — | 1.7 | 7.8 |

*LW = Lengthwise; CW–Crosswise

Pultruded material strengths based on ultimate strengths. Steel material strengths based on yield strengths.

Thus, despite the widespread use of FRP pultruded structural members in cooling towers, significant problems remain which detract from the overall utility of the concept.

SUMMARY OF THE INVENTION

The present invention overcomes the problems outlined above and provides structural channel members and complete structural assemblies made up of one or more of the channel members, together with a tubular beam and interconnected by a sleeve-type connector.

Broadly speaking, the structural channel members of the invention are in the form of integrally formed, elongated synthetic resin bodies presenting a primary web section having a pair of side margins and opposed inner and outer faces; a pair of end flanges project from each of the side margins of the web section to form a channel shape. The channels of the invention are improved by provision of a pair of oblique oriented legs each extending from the inner surface of the web section adjacent a side margin thereof and joined with the corresponding adjacent flange. In this fashion, the legs, outboard regions of the web section and the flanges define a pair of elongated hollow regions extending along the length of the body.

The preferred channel members are formed by pultrusion using fiberglass reinforced synthetic resin material. In addition, in order to provide maximum strength with minimum material usage, the web section has a thicker central region and thinner outboard regions adjacent the oblique legs. Furthermore, the flanges are of differential thickness, with relatively thin inboard portions and thicker outboard regions terminating in end edges.

The structural assemblies of the invention are made up of elongated tubular beam members integrally formed of synthetic resin material (preferably by pultrusion of FRP materials) and having a pair of opposed, apertured walls presenting substantially flat outer faces. Additionally, the assemblies include a pair of elongated channel members of the type described previously having apertured central web sections, with each of the channel members oriented with the outer faces of the web sections thereof adjacent a corresponding flat beam face and with the beam apertures in substantial registry with the channel members apertures. A connector is used to couple the channel members to the beam and is made up of a tubular sleeve (again preferably pultruded from FRP materials) with a bolt and nut assembly. The sleeve extends through the aligned apertures of the beam and web sections with the butt ends of the sleeves located at points adjacent the inner faces of the web sections; thus, the sleeve extends through the entire thickness of both the beam walls and the channel member web sections. The bolt is located within and extends through the sleeve with the bolt head proximal to an inner surface of one of the web sections. The nut is threadably attached to the bolt and is located proximal to the inner surface of the other of the web sections.

It has been found that the structural channels and assemblies of the invention can be used to good effect in both new and retrofit tower constructions. In the latter case, because the preferred components are sized to closely match the dimensions of their wooden counterparts, the pultruded components can be readily substituted for wooden parts.

DETAILED DESCRIPTION OF THE PREFERRED EMBODIMENT

Figure 1:
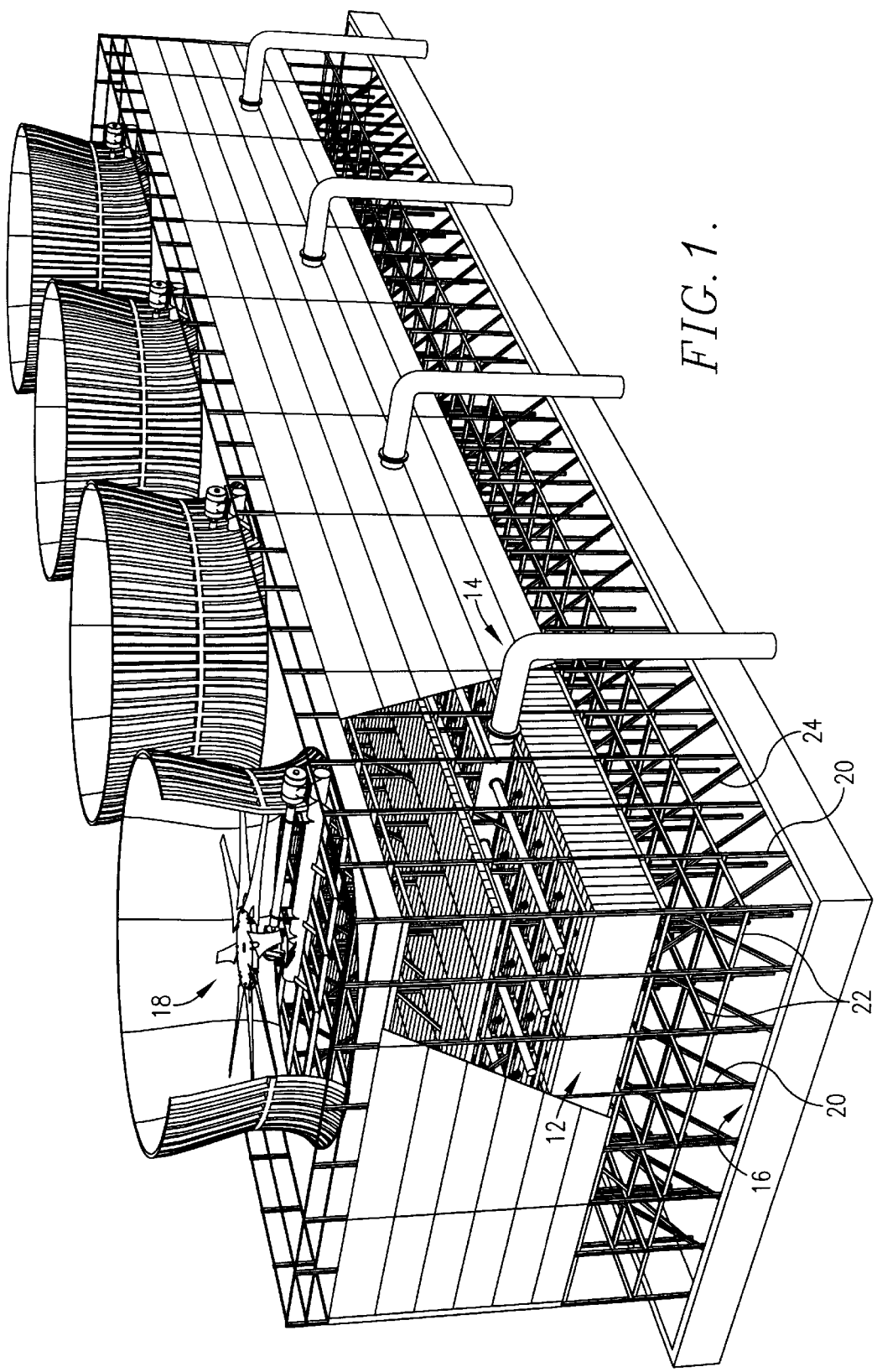
FIG. 1 is a perspective view with parts broken away of a large industrial induced-draft water cooling tower, constructed using the improved pultruded channel members and structural assemblies of the invention.
Figure 3:
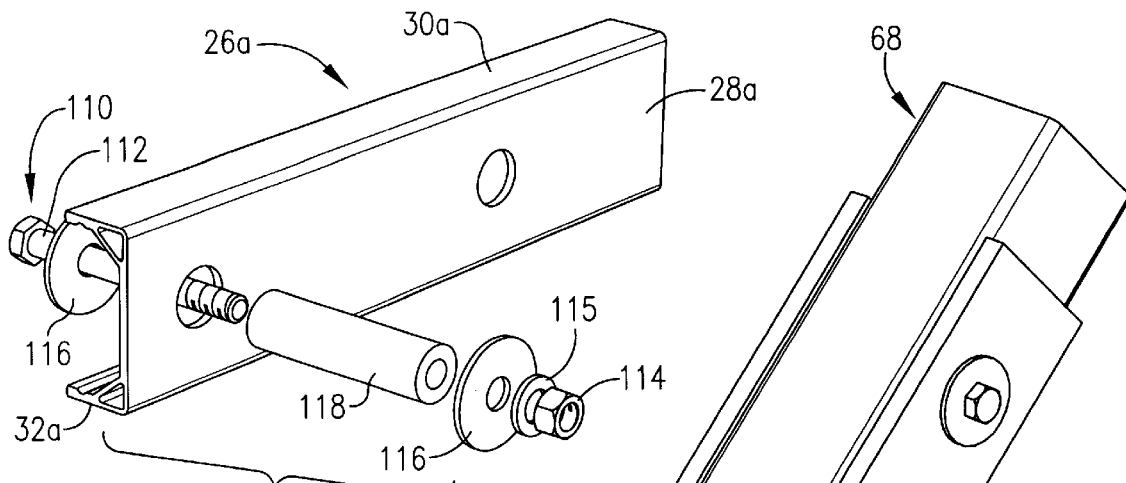
FIG. 3 is an exploded perspective view illustrating the apertured channel members in accordance with the invention, shown with a bolt and sleeve type coupler extending through a channel aperture.

Turning now to the drawings and particularly FIG. 1, a water cooling tower 10 is illustrated. Tower 10 is of the induced draft, counterflow type, and includes fill structure 12, a hot water distribution system 14 above the fill structure, and a lower cold water collection basin 16. A series of fan assemblies 18 are situated above the fill structure for inducing ambient air currents through the fill in an upwardly directed counterflowing relationship to hot water descending through the fill. As illustrated in FIG. 1, the overall structure of tower 10 is supported by upright columns or beams 20 with horizontal girts 22 and diagonal strut members 24. As will be explained more fully below, the illustrated tower employs the improved beams, channels and structural assemblies of the invention.

Figure 4:
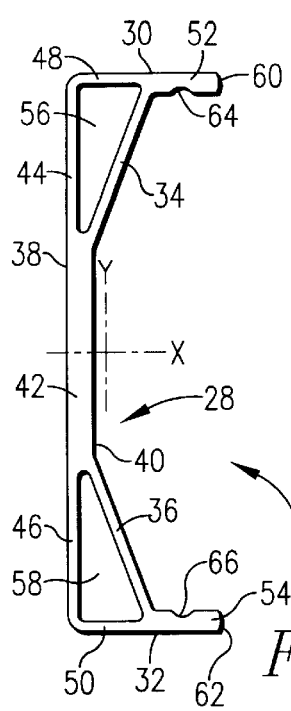
FIG. 4 is an end view of one type of pultruded channel member in accordance with the invention.

FIG. 4 illustrates an improved pultruded FRP channel member 26 in accordance with the invention. The member 26 is integrally formed as a pultruded body and has an elongated, generally rectangular web section 28 with a pair of endmost flanges 30, 32 respectively projecting from the side margins of the web section as shown. Oblique reinforcing legs 34, 36 extend from the web section 28 to the respective flanges 30, 32.

In more detail, it will be observed that the web section 28 includes an outer face 38 and an opposed inner face 40 and that the section 28 is of variable thickness across its width. Specifically, a central section 42 of the web section 28 is of increased thickness as compared with the outboard sections 44, 46 thereof. In like manner, the flanges 30, 32 are of variable thickness, presenting relatively thin sections 48, 50 adjacent the web sections 28, and thicker sections 52, 54 remote from the web section 28. The legs 34, 36 are preferably of substantially the same thickness as the outboard sections 44, 46 and the thin flange sections 48, 50. The legs 34, 36, web sections 44, 46 and flange sections 48, 50 cooperatively define a pair of hollow regions 56, 58 extending along the length of the channel member 26. The outboard, thicker flange sections 52, 54 present terminal edges 60, 62, and are moreover provided with rounded grooves 64, 66 extending along the inner faces thereof to facilitate channel attachment to other members by self-drilling, self-tapping screws.

Figure 5:
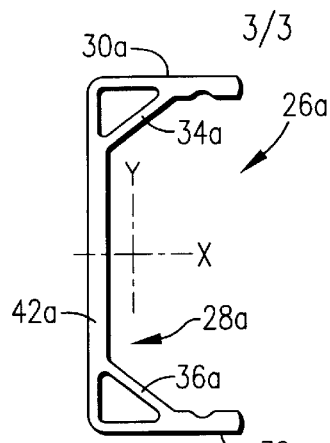
FIG. 5 is an end view of another preferred type of pultruded channel member.

FIG. 5 illustrates a conceptually similar channel member 26a having legs 34a, 36a, which are oriented at a steeper angle relative to the adjacent flanges 30a, 32a, so that the central section 42a of the web section 28a is proportionately of a greater width as compared with the central section 42 of the FIG. 4 embodiment. Given the similarity of these two embodiments, like reference numerals with a differentiating designator "a" have been applied to the FIG. 5 construction.

The channel members 26, 26a are preferably designed to match conventional lumber dimensions, thereby permitting direct replacement of existing wooden members in tower retrofits. In addition, the reduced web and flange thicknesses described previously lowers the cost of the channels by reducing material requirements. It has been found that this material reduction can be effected without materially detracting from the bending and shear capacities of the channels. It will be understood that use of internal mandrels during the pultrusion process allows the fabricator to alter the thickness of the diagonal legs, outboard sections of the web section and inboard sections of the flanges. For example, if the inboard flange portions are increased from about 0.1 inch thick to about 0.2 inch thick, the bending capacity about the strong or X-axis increases by 16.9% while adding only 8.6% more material. A series of different capacity channels can thus be made from a common outer surface pultrusion die and a series of different mandrel sets.

The provision of the integrally formed oblique legs 34, 36 and 34a, 36a in the channels 26 and 26a provide support for the marginal flanges which increases the overall strength of the channels. Flanges in structural shapes are predominantly tension and compression elements. Each flange develops tension or compression along the flange length due to applied bending and/or axial loads. Flanges in compression are subject to local flange buckling. The diagonal legs of the invention function to stiffen the flanges against local flange buckling. For example, the local buckling stress of the channel 26a (3.5 inches×1.5 inches) is 1.6 times the local buckling stress of flanges in a standard FRP pultruded channel of similar size (4 inches high×1-⅜ inches wide x ³⁄₁₆inch thick).

A common technique in cold form steel design is to provide edge stiffeners along the unsupported edge of the flange. Typically, lips would be bent at 90° from the plane of the flange. This technique could also be applied to pultrusions. However, this adds material and also provides an undesirable water and debris trap along the lower flange. A diagonal leg may extend from the web to the extreme edge of the flange to create a continuous loop without the cantilevered tip of the channel flange.

Conventional channel sections require the flanges to carry applied loads normal to the plane of the flange as a cantilever beam back to the web. This requires bending of the flange in the crosswise direction which is weaker than the lengthwise direction. The diagonal legs act as supports to reduce the bending, and thus the present invention can resist much more of this loading than conventional channels. Furthermore, the flanges of the present invention do not deflect as much as conventional flanges which for personnel who may walk on these flanges is particularly important both for comfort and safety.

Additionally, because of the closed loops created by the diagonal legs in concert with portions of the flanges and webs, the section is torsionally stiffer than a conventional channel section. The torsional constant, J is about 10 times greater than conventional channel sections. See the Table of Channel Properties below. Therefore, under axial compression and/or bending, these channels have a greater resistance to lateral torsional buckling. Long pieces are easier to handle as they do not tend to twist and lay over at the unsupported ends.

The outer portion of the flanges are formed by bringing together the respective top or bottom flange with the respective diagonal leg of its loop. This provides a thickened flat section which is superior for thread engagement of self-tapping screws. The outer portion may be greater than, less than or equal to the sum of the thicknesses of the adjoining legs. The preferred embodiment is equal thickness.

The center portion of the web thickness is proportioned to provide adequate bearing surface for mechanical fasteners. This width may be greater than, less than, or equal to the accumulative width of the legs of the loop that join together at the web.

Figure 7:
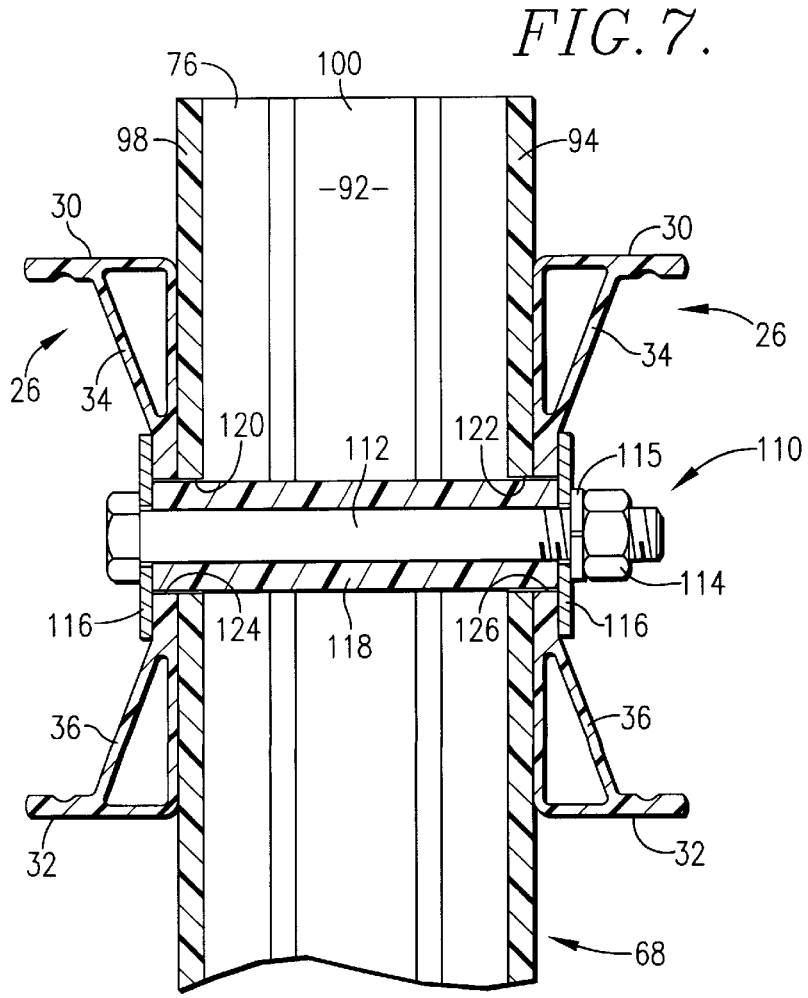
FIG. 7 is a vertical sectional view of a structural assembly useful in the context of water cooling towers and made up of a tubular beam with a pair of channel members coupled thereto via a bolt and sleeve coupler.
Figure 8:
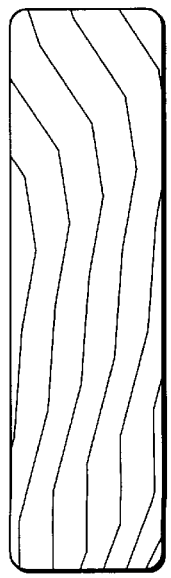
FIG. 8 is an end view of a typical wooden structural component used in prior art water cooling tower constructions.

As indicated, the channel members preferably match common lumber dimensions. Thus, a 3.5 inch×1.5 inch channel replaces a wood 2×4; a 5.5 inch×1.5 inch channel replaces a wood 2×6. This permits material reduction and reduces weight accordingly, making for easier handling by construction personnel. The 3.5 inch×1.5 inch channel of the invention versus a standard 4 inch×1-⅜ inch×³⁄₁₆ inch conventional channel saves 5% of material, whereas the 5.5 inch×1.5 inch channel of the invention saves 26% of material, compared with a conventional 6 inch×1-⅝ inch x¼ inch channel member. The close similarity between conventional wooden components and the channels 26, for example, is shown by a comparison of FIGS. 7 and 8. FIG. 8 depicts a common wooden beam, whereas the channels shown in FIG. 7 are closely similar in size.

The following table lists channel properties for the preferred channels of the invention versus standard conventional pultruded channels.

| | Table of Channel Properties | | | |
|---|---|---|---|---|
| Description | Invention C3 ½ × 1½ | Standard C4 1⅜ × ³⁄₁₆ | Invention C5 ½ × 1½ | Standard C6 1⅝ × ¼ |
| d, in. | 3.500 | 4.000 | 5.500 | 6.000 |
| b, in. | 1.500 | 1.375 | 1.500 | 1.625 |
| Area, in.² | 1.111 | 1.160 | 1.582 | 2.134 |
| Ix, in.⁴ | 1.841 | 2.484 | 5.429 | 9.722 |
| Sx, in.³ | 1.052 | 1.242 | 1.974 | 3.241 |
| Iy, in.⁴ | 0.223 | 0.183 | 0.263 | 0.422 |
| Sy(l), in.³ | 0.499 | 0.510 | 0.674 | 1.086 |
| Sy(r),in.³ | 0.211 | 0.180 | 0.237 | 0.341 |
| J, in.⁴ | 0.14 | 0.014 | 0.47 | 0.044 |

In the foregoing table, the symbols have the following meanings: d=depth of section, b=width of section, Area= cross-sectional area, Ix=moment of inertia about the x-axis, Iy=moment of inertia about the y-axis, Sx=section modulus about the x-axis, Sy=section modulus about the y-axis, (l)=left side of cross-section, (r)=right side of cross-section, and J=torsional constant.

Figure 6:
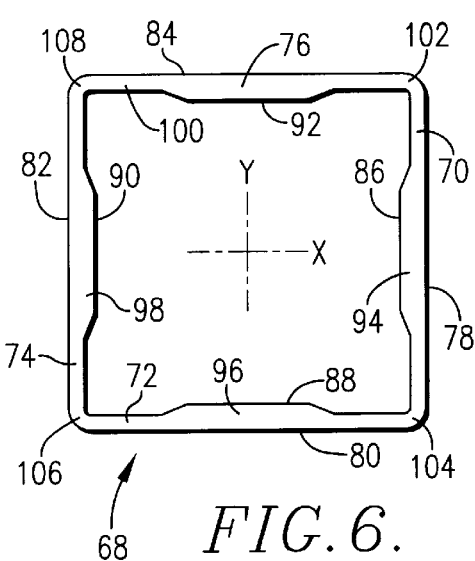
FIG. 6 is an end view of the preferred pultruded tubular beam members of the invention.

Referring now to FIG. 6, a preferred tubular FRP pultruded beam 68 is illustrated. The beam is of substantially square cross-section and has four walls for interconnected, integrally formed walls 70, 72, 74, 76 each presenting an outboard face 78, 80, 82, 84 and a corresponding inboard face 86, 88, 90, 92. In addition, each of the walls forming the beam has a thickened central region 94, 96, 98, 100 so that the overall beam presents four relatively thin corner regions 102, 104, 106, 108.

For towers with frames spaced 6 feet, the commonly used standard pultruded tube is 3×3×¼. The most common wood column is the 4×4 which is actually 3.5 inch×3.5 inch. Therefore, the preferred beams of the invention once again match the usual wood dimensions. This is important so as to avoid having to shim the pultruded tube to the wood column dimension at connections. An example of this occurs in replacing a plenum column in a wood crossflow tower. The wood columns in the fill structure space the girts 3.5 inch apart. Using a 3 inch wide tube requires that each side of the column be shimmed out 0.25 inch.

Load capacities of column and diagonal members in compression are often controlled by Euler (bifurcation) buckling, not by material strength or local buckling. When the capacity is limited by Euler buckling, the column is said to be a long or slender column. The Euler buckling load is commonly called the critical load, $P_{cr}$, and may be found from the following equation:

$$P_{cr} = \pi^2 EI/(KL)^2, \text{ where}$$

E=modulus of elasticity of the full section, I=moment of inertia, K=effective length factor which vary depending on type of column supports, simple pinned ended columns have K=1.0, and L=unbraced length of column.

The lesser of the material strength capacity or local buckling capacity defines the short column capacity. A transition zone exists between the long column and short column zones. This is sometimes called the intermediate column zone. Typical unbraced column lengths in stick built cooling towers range from 5 feet to 8 feet with 6 feet being the most common. The load capacity of the standard tube 3×3×¼ is controlled by Euler buckling for this range. At a 6 foot unbraced length, the short column capacity is approximately twice the long column capacity. Therefore, the present tubular beams seek to increase the long column capacity at the expense of the short column capacity. The moment of inertia, I, is directly proportional to the Euler buckling load. See the table below for comparisons of cross-sectional properties. The present tube preferred embodiment has 20% more Euler buckling capacity to failure than the standard tube 3×3×¼.

The preferred tubular beam hereof also uses less material for economy. As can be seen by comparing the cross-sectional areas, the present preferred embodiment saves 14.5% of the material. Additionally, the lighter weight makes for easier handling in fabrication and field installation.

Fasteners typically are located along the centerlines of the tube faces. The wall thickness is thicker in these regions to provide sufficient bearing surface for the fasteners. The thickness may be greater than, less than or equal to standard wall thicknesses, depending on application requirements. The preferred thickness is that which gives an equal bearing capacity to that of the girts. In the present preferred embodiment, this is 0.25 inch which is also the thickness of the thickened middle portion 42 of the web section 28 in the channel 26.

Table of Tube Properties

| Description | Invention 3½ × 3½ | Standard Tube 3 × 3 × ¼ |
| --- | --- | --- |
| b = 3, in. | 3.500 | 3.000 |
| Area, in.$^2$ | 2.335 | 2.730 |
| Ix = Iy, in.$^4$ | 4.141 | 3.451 |
| Sx = Sy, in.$^3$ | 2.366 | 2.301 |

Figure 2:
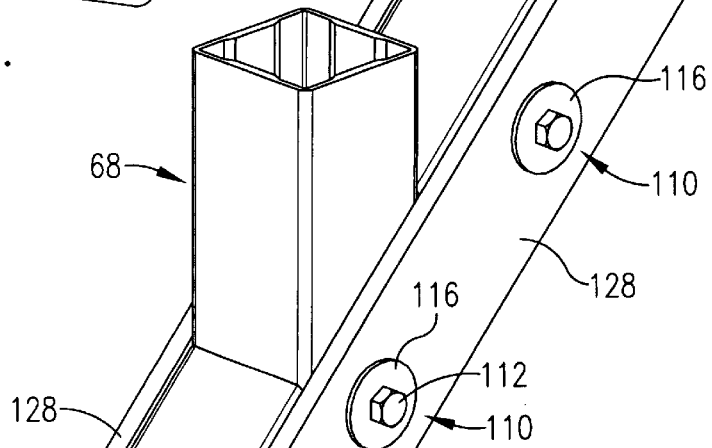
FIG. 2 is a fragmentary perspective view illustrating a structural assembly used in the context of water cooling towers and including pultruded tubular beams and pultruded channel members in accordance with the invention.
Figure 2:
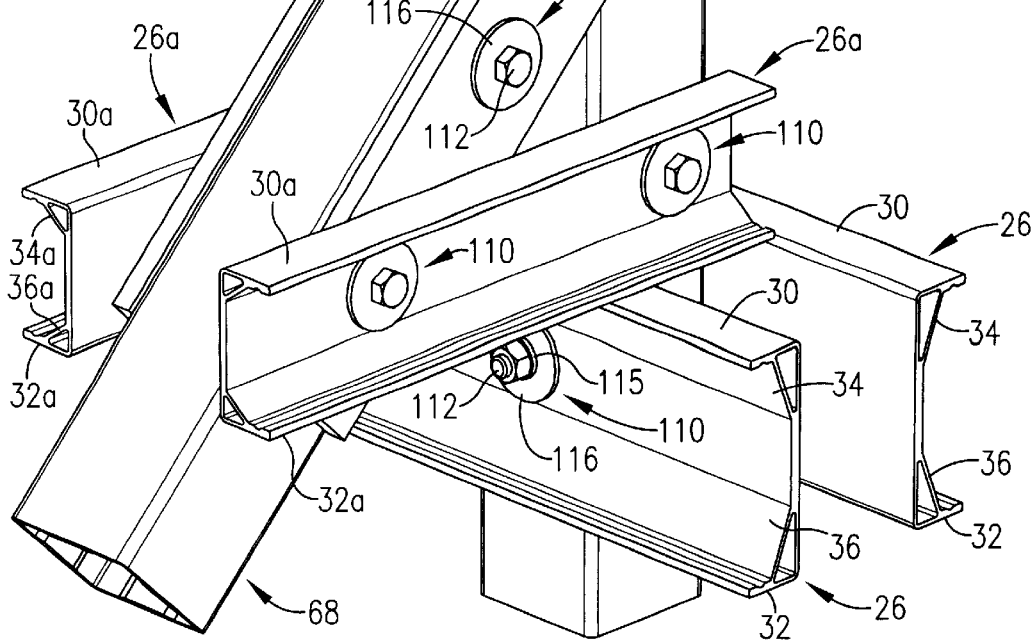

In FIGS. 2 and 7, typical structural assemblies are illustrated making use of the previously described channel members and tubular beams 68. As illustrated in FIG. 2, the beams 68 may be substantially upright or oriented obliquely in the fashion of a strut. The larger channel members 26 are used in certain applications where higher loadings are experienced, whereas the smaller channel members 26a are used in lower load situations.

The interconnection between the tubular beam 68 and the channel members 26 or 26a is effected by means of a connector 110 comprising a bolt 112, nut 114, split washers 115, large washers 116 and a tubular, integrally formed pultruded FRP sleeve 118. An anaerobic locking compound which wicks into the bolt threads may also be applied at the nut. In the use of the connectors 110 (see FIG. 7), opposed walls of the beam 68 are apertured as at 120, 122, and also the channels to be connected thereto have their web sections apertured as at 124, 126. The obliquely oriented beam 68 may be reinforced with a pair of apertured splice plates 128 as shown. During the connection process, the channel members 26 are placed with the outer faces thereof adjacent to or in engagement with the apertured outer surfaces of the beam walls, so that the apertures 120, 124 and 122, 126 are in substantial registry. Next, the sleeve 118 is inserted through the registered openings so that the butt ends of the sleeve are located proximal to the inner surfaces of the web sections of the channel members. Next, a first washer 116 is passed over the shank of bolt 112, and the latter is inserted into the sleeve so that the bolt extends through the length thereof. A second washer 116 and a split washer 115 are then applied over the threaded end of the bolt, and nut 114 is attached to the bolt shank in the usual fashion. Tightening of the nut 114 thus provides a secure connection between the beam 68 and the attached channel members, particularly through use of the split washer 115 and anaerobic locking compound. Where use is made of the splice plates 128, the sleeves 118 are of a length to extend through the thicknesses of the plates 128 as well, so that the butt ends of the sleeves 118 are located closely adjacent the exterior faces of the plates 128.

As is apparent from the foregoing discussion, the sleeve 118 is a hollow tubular body which fits over the bolt 112 and increases the bearing area of the fastener, thus providing higher load capacity in the resultant connection. Larger diameter bolts can be used in lieu of sleeves but are usually more expensive. One-half inch diameter 300 series stainless steel pipe sleeves have been used in the past. The outside diameter is 0.840 inch. For ½ inch diameter schedule 40 pipe, the inside diameter is 0.622 inch, and for schedule 80, it is 0.546 inch. The fit of a ½ inch diameter bolt is very loose in the schedule 40, though in most circumstances, the sleeve transfers all the load while the bolt serves only to clamp the parts together and hold the sleeve in position. The schedule 80 pipe fits better but is more expensive and the additional material is not needed for load transfer.

Structural connections commonly utilize holes which are oversized by 1/16 inch. The outside diameter, 0.840 inch is about $^{27}/_{32}$ inch. Oversizing by $^{1}/_{16}$ inch gives $^{29}/_{32}$ inch. This is not a common drill bit size. Seven-eighths inch (=$^{28}/_{32}$ inch) diameter holes are very tight for fitting up the connecting members while $^{15}/_{16}$ inch (=$^{30}/_{32}$ inch) is a little loose. Therefore, use of properly sized pultruded sleeves (which can be readily fabricated to any reasonable dimension) provides a better overall connection.

The preferred sleeves of the invention provide a greater bearing surface than in conventional designs. The outside diameter of the sleeve is preferably about 1.06 inches, which gives about 26% more bearing surface (capacity). The inside diameter of the preferred sleeve is 0.53 inch, providing a 0.03 inch tolerance to permit bolt insertion. This close tolerance allows the bolt to participate with the sleeve in transmitting shear loads. Finally, pultruded sleeves are more economical than commonly used stainless steel pipe, and such sleeves are applicable to all water chemistries appropriate for FRP cooling towers.

The pultruded components of the invention can be fabricated from a number of synthetic resin systems. Preferably, use is made of the well-known isophthalic polyester resins, or alternately vinyl ester resins.

It will thus be appreciated that the beams 68, channels 26 or 26a and the connectors 110 can be used in the tower 10 of FIG. 1, as shown.

I claim:

1. A water cooling tower constructed to include at least one structural channel member comprising an integrally formed, elongated synthetic resin body presenting a primary web section having a pair of side margins and opposed inner and outer faces, a pair of end flanges respectively projecting from a side margin of the web section, and a pair of obliquely oriented legs each extending from the inner surface of said web section adjacent a side margin thereof and joined with the corresponding adjacent flange, said legs, the outboard regions of said web section and said flanges defining a pair of elongated hollow regions extending along the length of the body.

2. The tower of claim 1, said body formed by pultrusion.

3. The tower of claim 1, said body formed of fiberglass reinforced synthetic resin material.

4. The tower of claim 1, said legs being spaced apart to define therebetween a central portion of said web section.

5. The tower of claim 4, said central portion of said web section being thicker than said outboard regions of said web section.

6. The tower of claim 1, said flanges each presenting an edge remote from said web section, said flanges each having a width between said web section and the corresponding edge, said legs being joined with said flanges at points between the web section and said edges.

7. The tower of claim 6, said flanges being thicker between the points of joinder of said legs and the corresponding flange edges, as compared with the thickness of the flanges between said points of joinder and said web section.

8. A water cooling tower including a structural assembly, said assembly comprising:

an elongated tubular beam member integrally formed of synthetic resin material and having a pair of opposed, apertured walls presenting substantially flat outer faces;

a pair of elongated channel members integrally formed of synthetic resin material and each having a generally flat apertured primary web section presenting an outer face and an inner face with a pair of flanges projecting from the side margins of the web section, each of said channel members being oriented with the outer faces of the web sections thereof adjacent a corresponding beam face, with the web section apertures in general registry with the beam wall apertures, and with said flanges extending outwardly and away from said beam;

each of said channel members having a pair of obliquely oriented legs respectively extending from the inner face of the inner face of the web section adjacent a side margin thereof and joined with the corresponding adjacent flanges said legs, the outboard regions of said web section and the flanges defining a pair of elongated hollow regions; and a connector coupling said channel members to said beam and comprising a tubular sleeve integrally formed of synthetic resin material and a bolt and nut assembly comprising a headed bolt and a nut, said sleeve extending through said aligned apertures of said beam and said web sections with the butt ends of the sleeve located at points adjacent the inner faces of said web sections, said bolt located within and extending through said sleeve with the head thereof proximal to an inner surface of one of said web sections, said nut threadably attached to said bolt and located proximal to the inner surface of the other of said web sections, said connector holding said channels and beam together.

9. The tower of claim 8, said beam and said channel members formed by pultrusion.

10. The tower of claim 8, said beam and said channel members formed of fiberglass reinforced synthetic resin material.

11. The tower of claim 8, there being central portions of said web sections between said legs, said central portions being thicker than said outboard regions of said web sections.

12. The tower of claim 8, said flanges each presenting an edge remote from said web section, said flanges each having a width between said web section and the corresponding edge, said legs being joined with said flanges at points between the web section and said edges.

13. The tower of claim 12, said flanges being thicker between the points of joinder of said legs and the corresponding flange edges, as compared with the thickness of the flanges between said points of joinder and said web section.

14. The tower of claim 8, said beam being substantially square in cross-section.

15. The tower of claim 8, said beam having walls defining corners, the center sections of said walls being thicker than said corners.

16. The tower of claim 8, including a first washer interposed between said bolt head and said inner surface of said one web section, and a second washer interposed between said nut and the inner surface of the other of said web sections.

17. The tower of claim 8, the inner diameter of said sleeve being no more than about 0.03" larger than the outer diameter of the bolt received therein.

* * * * *